United States Patent [19]

Audifferd, Jr. et al.

[11] 3,951,009
[45] Apr. 20, 1976

[54] OVERRIDE CONTROL SYSTEM FOR A CONTROLLED SLIPPABLE CLUTCH

[75] Inventors: Sidney J. Audifferd, Jr.; James L. Schmitt, both of Washington, Ill.

[73] Assignee: Caterpillar Tractor Co., Peoria, Ill.

[22] Filed: Feb. 21, 1974

[21] Appl. No.: 444,511

Related U.S. Application Data

[63] Continuation of Ser. No. 237,254, March 23, 1972, abandoned.

[52] U.S. Cl. .................................. 74/732; 74/730; 192/3.57
[51] Int. Cl. ..................... F16h 47/00; B60k 41/22; F16d 67/00
[58] Field of Search ............. 192/109 F, 85 R, 3.57, 192/103 F; 74/730, 732, 733

[56] References Cited
UNITED STATES PATENTS

| | | | |
|---|---|---|---|
| 2,893,526 | 7/1959 | Smirl | 192/85 R |
| 3,352,392 | 11/1967 | Black et al. | 192/3.57 |
| 3,583,243 | 6/1971 | Wilson | 192/109 F |
| 3,621,955 | 11/1971 | Black et al. | 74/733 X |
| 3,799,304 | 3/1974 | Richmond et al. | 74/732 X |
| 3,831,726 | 8/1974 | Woody et al. | 192/103 FA |

*Primary Examiner*—Samuel Scott
*Assistant Examiner*—Lance W. Chandler
*Attorney, Agent, or Firm*—Phillips, Moore, Weissenberger Lempio & Strabala

[57] ABSTRACT

A control system for a drive train having an engine-driven power input member and auxiliary equipment associated therewith, a power output member, a hydraulically-operated slippable clutch coupling the power input member and power output member, the control system including a control valve operable in a first fluid flow condition to provide a maximum predetermined pressure level for fully engaging the clutch and a second fluid flow condition to provide an adjusted pressure level lower than the predetermined pressure level for partially engaging the clutch, and an override valve for selectively establishing either the first or second fluid flow conditions of the control valve and providing convenient changeover between the two power apportioning conditions of operation.

3 Claims, 12 Drawing Figures

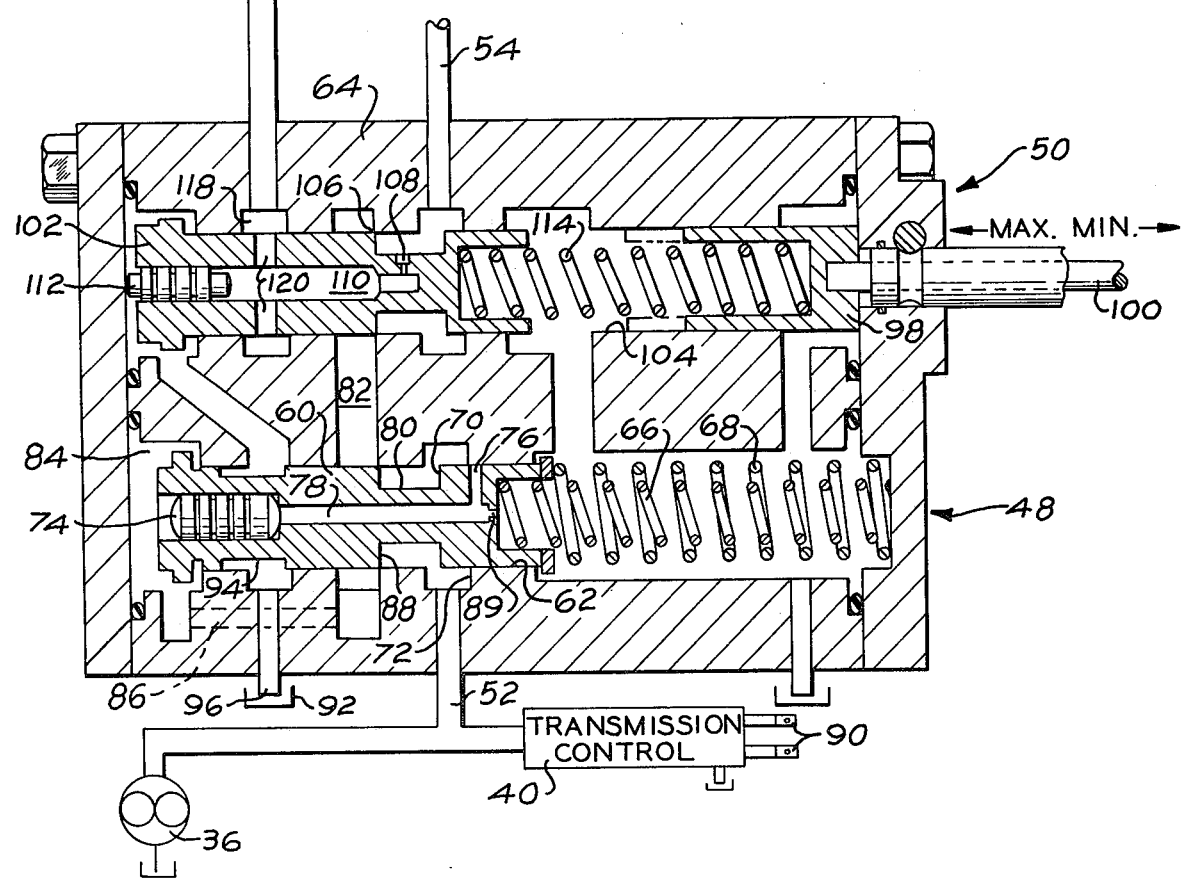

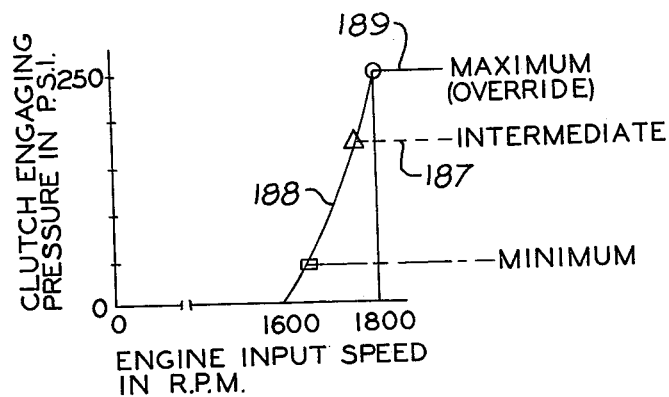
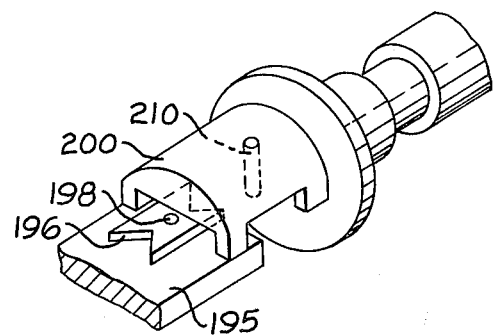
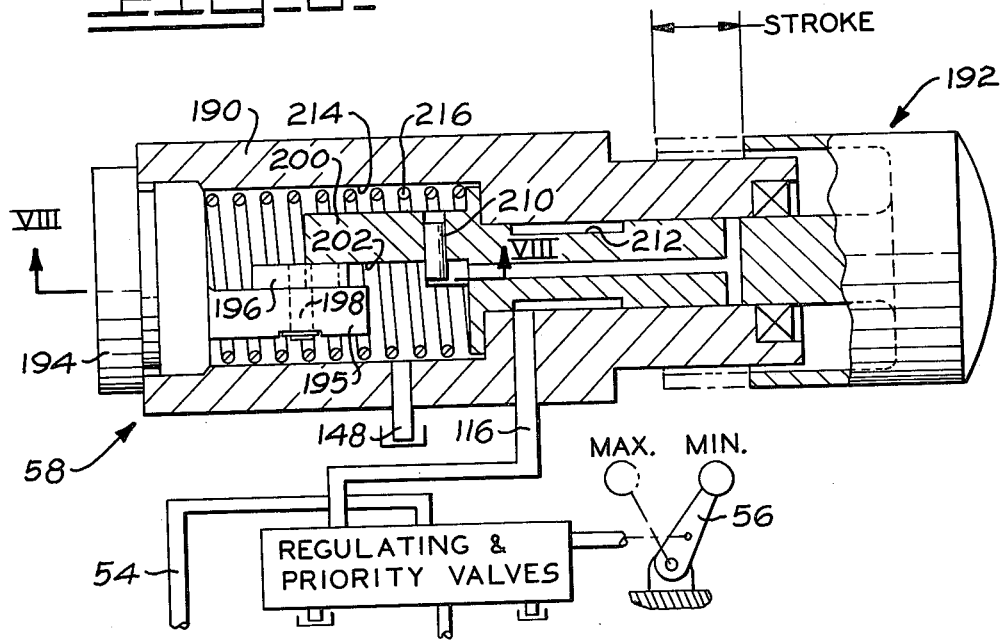

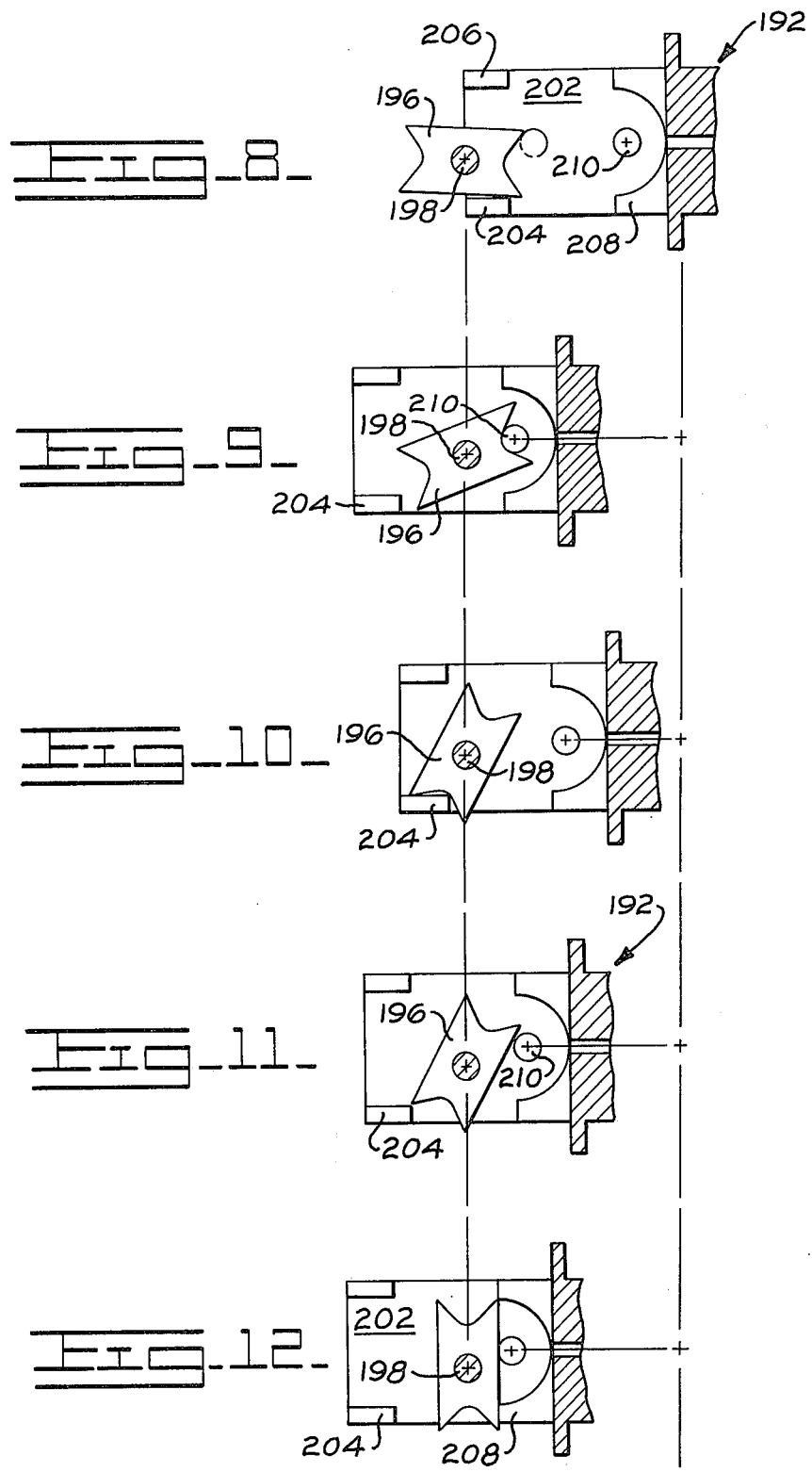

OVERRIDE CONTROL SYSTEM FOR A CONTROLLED SLIPPABLE CLUTCH

This is a continuation of Ser. No. 237,254, filed Mar. 23, 1972 now abandoned.

BACKGROUND OF THE INVENTION

The present invention relates to an override system for a drive train having hydraulically-operated means such as a slippable clutch for varying torque transmission in the drive train and preferably for apportioning power between different types of driven members. Two examples of adapting a slipping clutch to a drive train are shown in U.S. Pat. No. 3,424,029, issued to J. Horsch et al. on Jan. 28, 1969, and U.S. Pat. No. 3,478,621, issued to L. E. Johnson et al. on Nov. 18, 1969, both of these patents being assigned to the assignee of the present invention.

More specifically, the present invention provides an override control system which is an improvement over application Ser. No. 86,793, now abandoned, entitled "Drive Train With Controlled Slipping Clutch," of A. L. Woody et al., filed on Nov. 4, 1970, and also assigned to the assignee of the present invention. Application Ser. No. 86,793 was abandoned in favor of continuation application, Ser. No. 304,492, now U.S. Pat. No. 3,831,726. That application relates to a control system for apportioning power to engine-driven auxiliary equipment and to a power output member through pressure control of a hydraulically-operated slippable clutch. Such a system contains a manually-controlled regulating valve that is adjustable within a given range to establish an actuating pressure level in the slippable clutch. With a maximum pressure level setting, the slippable clutch remains fully engaged at high engine speeds to deliver maximum power to the power output member. With an intermediate pressure level setting of the regulation valve, the clutch normally slips in a controlled manner to apportion more power to the auxiliary equipment at the expense of power delivery to the power output member. Thus, the operator can select the mode of operation best suited to the instant phase of operation for the drive line.

However, it has been found that the operator normally selects a predetermined and balanced intermediate power delivery setting for a first instant phase of operation of the drive line. To establish a second instant phase of operation immediately thereafter requiring a maximum pressure load setting to the slippable clutch, the operator has heretofore had to quickly manipulate the manually-controlled regulating valve. Since cyclic and repetitive operational situations are common, it is often necessary for the operator to quickly adjust the regulating valve to a sometimes delicate setting in order to return the drive line to the first instant phase of operation. Thus, the aforementioned control system has sometimes been found to require excessive operator hand control at a time when he is busy with other aspects of the operation. The control system of the present invention overcomes this problem by providing a quick and convenient means to changeover between two power-apportioning modes of operation of a slippable clutch drive train.

SUMMARY OF THE INVENTION

It is an object of the present invention to provide an override control system for variable power transmission means in a drive train, the control system permitting rapid changeover between two conditions of operation, one condition entailing maximum torque transmission, the other condition entailing adjusted and variable torque transmission in the drive train.

It is also an object of the present invention to provide an override control system for a hydraulically-controlled variable torque transmitting means in a drive train of a vehicle having auxiliary powered work implements thereon adapted normally to apportion a greater power delivery to the work implements which is capable of instantaneously maximizing power delivery to the drive train while subordinating power delivery to the work implements for optimum vehicle performance under all operating conditions.

Another object of the invention is to provide an override control system for a controlled slippable clutch which has a pressure regulating valve adjustable to provide the clutch with a pressure lower than a maximum predetermined pressure wherein power delivery is favored to auxiliary powered equipment by slipping the clutch and by providing an override valve that will permit quick changeover in the mode of operation of the pressure regulating valve from such lower pressure setting to one of permitting a maximum pressure setting to be delivered to the clutch wherein power delivery is favored to the drive train by fully engaging the clutch.

Other objects and advantages of the present invention will become more readily apparent upon reference to the accompanying drawings and following description.

BRIEF DESCRIPTION OF THE DRAWINGS

FIG. 3 is a somewhat enlarged, longitudinal central vertical section through an override valve and a regulating and priority valve of the override control system of the present invention shown schematically in FIG. 1.

FIG. 4 is a side elevation of a foot-actuated mechanism associated with the override valve of FIG. 3.

FIG. 5 is a graph depicting traces of clutch engagement pressure versus engine input speed for a normal intermediate operating setting and the override setting obtainable with the control system of the present invention.

FIG. 6 is a longitudinally sectioned view of a second embodiment of the override valve incorporating the principles of the present invention.

FIG. 7 is an isometric view of the second embodiment of the override valve of the present invention.

FIG. 8 is a partial longitudinally sectioned view through the second embodiment of the override valve taken along the line VIII—VIII of FIG. 6 and corresponding to a first position of the valve mechanism.

FIG. 9 is a partial longitudinally sectioned view of the second embodiment of the override valve similar to FIG. 8 with the override valve mechanism being positioned for a second condition of operation.

FIG. 10 is a partial longitudinally sectioned view similar to FIG. 9 with the override valve mechanism positioned for a third condition of operation.

FIG. 11 is a partial longitudinally sectioned view similar to FIG. 10 with the override valve mechanism positioned for a fourth condition of operation.

FIG. 12 is a partial longitudinally sectioned view similar to FIG. 11 with the override valve mechanism positioned for a fifth condition of operation.

DESCRIPTION OF THE PREFERRED EMBODIMENT

Figure 1:
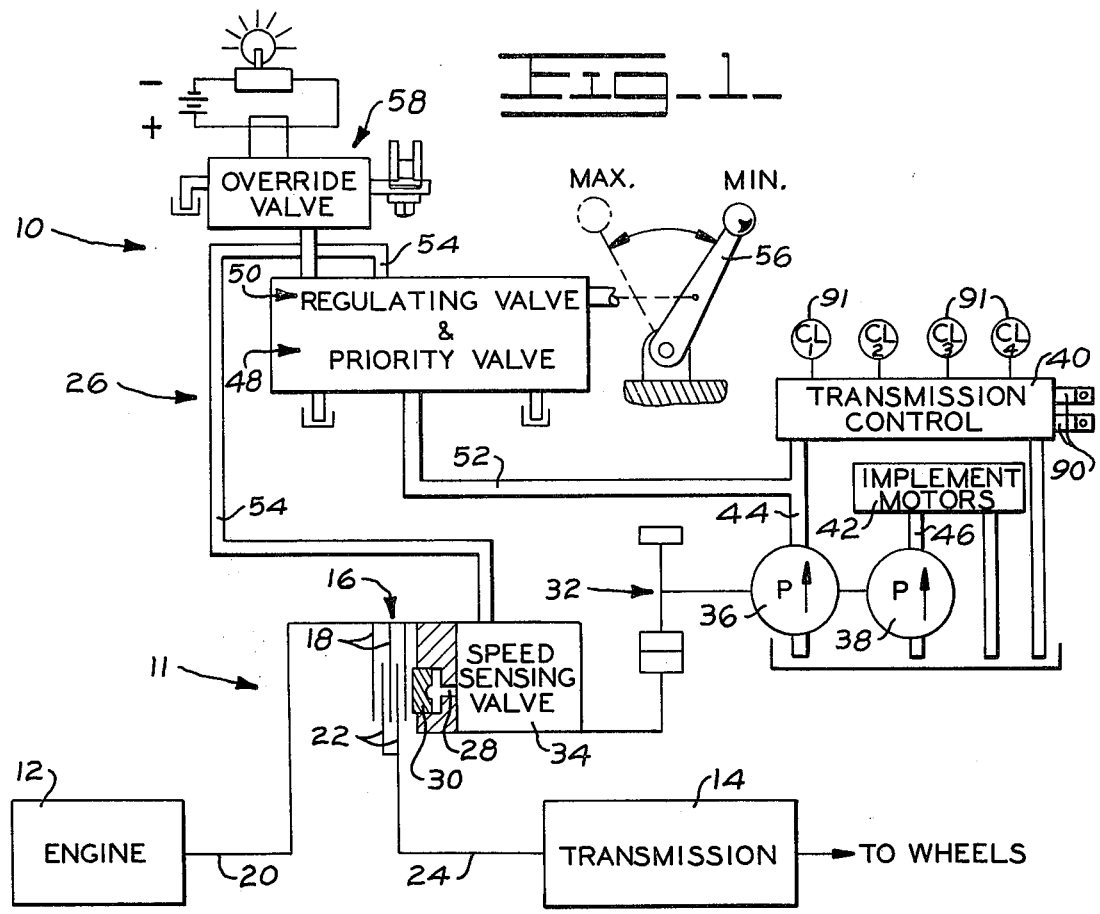
FIG. 1 is a schematic diagram of a drive train incorporating the override control system of the present invention for regulating operation of a hydraulically-operated slippable clutch.

Referring to the drawings, and particularly to FIG. 1, an override control system which embodies the novel features of the present invention is generally designated by the reference numeral 10. A drive train schematically shown at 11 includes a prime mover or engine 12 which is connected to a suitable transmission 14 through a variable power transmission means such as the hydraulically-operated slippable clutch indicated at 16. Slippable clutch 16 contains a plurality of clutch discs or plates 18 which are fixed for rotation with a power input member 20 connected to engine 12. Additional clutch discs or plates 22 are coupled for rotation with a power output member 24 in driving relation to the input of transmission 14, and thereafter to the wheels of the vehicle or shaft of a marine gear of the like (not shown). The control system 10 of the present invention, to be described below, supplies fluid to a passage 28 and to a clutch actuating piston 30 to engage discs 18 and 22.

Engine-driven auxiliary equipment such as the powered work implements of an earthmoving loader or the like as shown generally at 32 frequently require considerable peak horsepower for operation. With a high peak horsepower demand by power output member 24 leading to wheels of the vehicle (not shown), the load upon engine 12 would increase sufficiently to reduce the operating speed of the engine, were it not for the incorporation of slippable clutch 16. By normally operating engine 12 near its full throttle condition and by incorporating slippable clutch 16 intermediate engine 12 and power output member 24, more power may be delivered to auxiliary equipment 32 at periods of high power demand by a speed sensitive control system that will serve to slip clutch 16.

Control system 10 is speed sensitive and normally apportions power to auxiliary equipment 32 and to a power output member 24 in a manner similar to that described in copending application Ser. No. 86,793, now abandoned, as noted above. A speed sensing means may comprise a centrifugal valve as indicated at 34 which rotates with power input member 20 and auxiliary equipment 32 as disclosed in the above-designated copending application. Auxiliary equipment 32 includes a plurality of hydraulic implement pumps 36 and 38 which supply fluid to a transmission control 40 and implement motors 42 through conduits 44 and 46 respectively.

Pump 36 further supplies fluid to a priority valve 48 and a regulating valve 50 through a branch conduit 52. Priority valve 48 and regulating valve 50 are shown in detail in FIG. 3 and are generally similar to corresponding valves disclosed in the above-designated copending application, except that priority valve 48 has a pressure reducing function as will be described below. Regulating valve 50 establishes a predetermined maximum pressure level in a conduit 54 which supplies fluid to speed sensing valve 34. Regulating valve 50 is adjustable by a manual control lever 56 so that any given pressure level, within a certain range, may be normally maintained in conduit 54.

The present invention has a manually-operated override valve 58 which has one mode of operation that does not influence the pressure level established in conduit 54 by regulating valve 50, and an override mode of operation which deactivates the regulating valve and causes a maximum pressure to be supplied to conduit 54. Reference is now made to the longitudinal sectional views of override valve 58, regulating valve 50, and priority valve 48 shown by FIG. 3 for details of the subject control system.

Priority valve 48 normally receives fluid from branch conduit 52 at a maximum pressure established by a separate relief valve (not shown) within transmission control 40. Priority valve 48 consists of a spool 60 disposed for reciprocal movement in a bore 62 of a housing 64. Spool 60 is biased leftwardly by a pair of springs 66 and 68 so that with no pressure in the system a metering edge 70 of the spool closes off a supply annulus 72. However, pressure in conduit 52 and annulus 72 is transmitted through the spool to a reaction slug 74 via a passage 76 and a passage 78. Rightward movement of spool 60 therefore occurs after a predetermined pressure level is reached to communicate a spool annulus 80 with a passage 82. Passage 82 provides a normally fixed pressure level for regulating valve 50. The pressure in passage 82 also acts on the left end of spool 60, since a chamber 84 is in communication with passage 82 via a cross passage 86. Upon being shifted rightwardly, spool 60 meters fluid to passage 82 past a spool land 88 to perform its reducing valve function. When spool 60 is metering, passage 76 is blocked by bore 62 and pressure in passage 78 is allowed to bleed out of an orifice 89 to drain. This reduces the pressure acting on slug 74 and reduces the total metering spring force required.

Valve 48 further provides a priority function in the event that supply pressure is reduced in conduit 52. When transmission control 40 is actuated by selector spools 90 in order to provide a new gear ratio in transmission 14, new clutches 91 are being filled and pressure drops rapidly in conduit 52 until the transient period of a shift is finished. When this occurs, spool 60 moves rapidly to the left and opens passage 82 to a drain 92 via passage 86, chamber 84, spool annulus 94, and passage 96. Since passage 82 provides the primary fluid supply to clutch 16 through intermediate regulating valve 50 and speed sensing valve means 34, it may be appreciated that this pressure drop will place the clutch in a condition of minimum capacity.

Regulating valve 50 also serves as a reducing valve, only with an adjustable setting to provide a range of predetermined pressures to conduit 54. More particularly, the operator can adjust manual control lever 56, as shown in FIG. 1, in a counterclockwise direction to cause a load piston 98, as shown in FIG. 3, to be moved leftwardly from the minimum pressure setting shown. Lever 56 and load piston 98 are connected by a cable system 100 that holds the cable and load piston in any preset condition even though the operator removes his hand from lever 56.

Regulating valve 50 includes a spool 102 disposed in a bore 104 of housing 64 and is shown in a condition to reduce pressure at metering edge 106 to conduit 54. The downstream pressure acts through an orifice 108 and a passage 110 within the spool against the area of a slug 112 to urge spool 102 to the right against the load of a spring 114 as established by load piston 98.

Regulating valve 50 and override valve 58 are connected by a conduit 116 leading from an annulus 118 and bore 104. Passage 110 within spool 102 is always in communication with annulus 118 through cross passages 120 so that balancing pressure in passage 110 may be released to drain through the override valve to deactivate regulating valve 50 from its metering condition. More particularly, and with reference to both FIG. 3 and FIG. 4, regulating valve 58 includes a foot-operated plunger 122 which protrudes through floor plates 124. As plunger 122 is depressed, a lever 126 rotates in a clockwise direction through a stroke angle S. Since lever 126 is secured to a shaft 128 by bolt 130, shaft 128 likewise rotates and causes similar movement of a rotatable spool 132 through a one-way clutch 134. When plunger 122 is released, a return spring 135 urges lever 126 and shaft 128 in a counterclockwise direction, but spool 132 does not return with it because of the freewheeling nature of one-way clutch 134 and a pair of opposed ball detents 136. Ball detents 136 individually interlock within a plurality of notches 138 equally spaced about the periphery of spool 132. A needle bearing 140 rotatably supports shaft 128, and a thrust flange 142 axially supports it within a housing 144.

Spool 132 is further provided with a plurality of equally spaced radial ports 146 that serve to communicate passage 110 of the regulating spool to a drain 148 at every other depression of plunger 122 via conduit 116. Therefore, override valve 58 has two positions either opening passage 110 to drain or allowing pressure from conduit 54 to build up within the passage 110 when spool 132 blocks off passage 116. Override valve 58 is further provided with a ball displacement type electrical switch 150 and an indicator light 152, permitting visual determination as to the condition under which the slippable clutch control system is operating. Switch 150 is activated by the same ports 146 which drain passage 110. The indicator light glows when a ball 153 does not engage one of the parts 146, a position corresponding to a maximum pressure condition in conduit 54, so that the operator is made aware that clutch 16 is potentially fully engaged and in a condition favoring power delivery to power output member 24.

Figure 2:
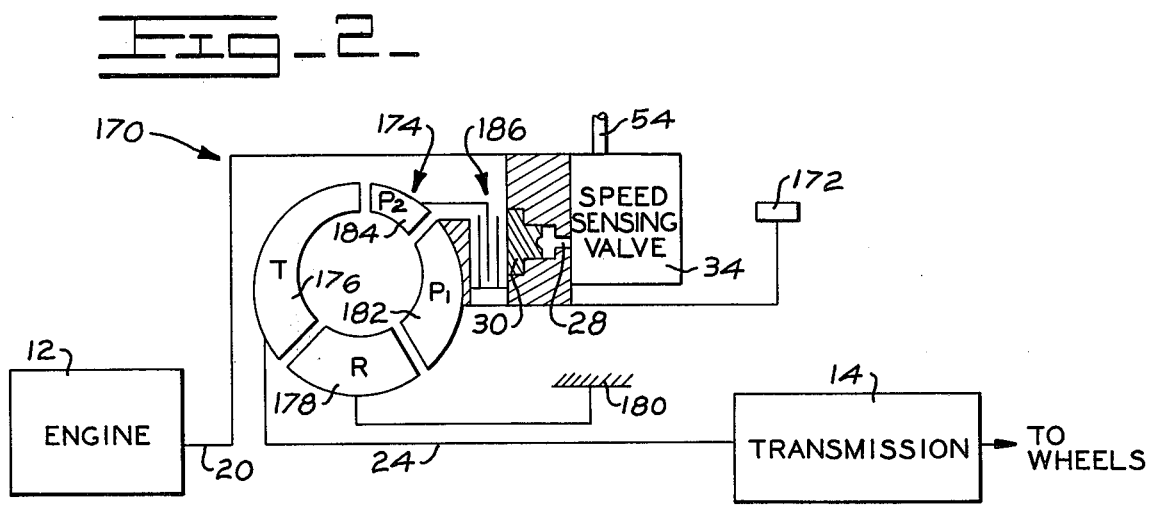
FIG. 2 is a schematic diagram partially showing the control system of FIG. 1 adapted to a torque converter drive train having an input member connected to the slippable clutch.

The override control system 10 of the present invention is adaptable to torque converter drive train arrangements, such as that shown in FIG. 2, including variable power transmission means such as a slipping clutch. A torque converter 170 is disposed in series with the power input member 20 and power output member 24. In a manner similar to FIG. 1, engine power is supplied to auxiliary equipment through a drive gear 172 adapted for rotation with input member 20. Torque converter 170 preferably includes a compound pump or impeller system 174, a turbine member 176 connected to power output member 24, and a reactor member 178 secured to a stationary housing 180. Impeller system 174 includes a primary impeller member 182 directly driven by power input member 20, and a secondary impeller member 184 which may be directly locked up for rotation with primary impeller 182 through full engagement of a hydraulically-operated clutch 186, or may be slipped or freewheeled through partial or full disengagement of clutch 186. Thus, the torque-transmitting capacity of the converter may be varied from a maximum value obtained when both impellers 182 and 184 are rotating together to a minimum value obtained when outer impeller member 184 is freewheeling with respect to inner impeller member 182.

The control system 26 described with respect to FIG. 1 and including clutch supply conduit 54, speed sensing valve 34, conduit 28, and clutch actuating piston 30 is directly applicable to the FIG. 2 drive train.

OPERATION

While the operation of the present invention is believed clearly apparent from the foregoing description, further amplification will subsequently be made in the following brief summary of such operation.

If the drive train power requirements of FIG. 1 are high for both the auxiliary equipment 32 and power output member 24 leading to the wheels and it is desired to maintain a relatively high power input to the auxiliary equipment, the regulating valve 50 is adjusted to an intermediate setting through manual movement of lever 56. This locates load piston 98 in the phantom position shown on FIG. 3 and places an intermediate spring load on reducing spool 102. Reducing spool 102 thus meters fluid from supply conduit 82 to conduit 54 leading to speed sensing valve 34. With an engine normally designed for full-throttle operation under such conditions, it has been found desirable to supply pressure to slippable clutch 16 in a manner shown by FIG. 5 and also set forth in application Ser. No. 86,793 referenced above. The intermediate pressure setting of regulating valve 50 is reflected on the graph of FIG. 5 by broken line 187. Above an engine speed of approximately 1750 rpm, for example, this regulated pressure in conduit 54 is supplied to clutch actuating piston 30 of FIG. 1 through speed sensing valve 34 and passage 28 in such a manner that clutch 16 is in an intermediate capacity condition. As the combined power requirements of the auxiliary equipment and power output member increase, the higher load causes engine speed to decrease until speed sensing valve 34 meters fluid pressure to the clutch in a manner shown by solid line 188. This lowering of the pressure by speed sensing valve 34 favors power delivery to auxiliary equipment 32 at the expense of power delivery to power output member 24, but frequently these auxiliary peak power demands are of such short duration that the actual effect on the power supplied to the output member is not great.

The intermediate power balance condition mentioned above favors power delivery to auxiliary equipment 32. If it is desired to quickly return to a condition maximizing power delivery to power output member 24, the plunger 122 is depressed, as shown in FIG. 4, to cause rotation of shaft 128 and spool 132, and open passage 110 within reducing spool 102 to drain 148 via conduit 116 as shown in FIG. 3. This immediately deactivates spool 102, moving it fully to the left, whereupon the full supply pressure in passage 82 is communicated to speed sensing valve 34. This override mode of operation and higher pressure causes positive clutch engagement above 1800 rpm as shown by solid line 189 on the graph of FIG. 5. More power will then be supplied to the power output member at the possible expense of the auxiliary equipment power demands.

The slipping clutch and torque converter combination of FIG. 2 has been found very effective to match engine capabilities with variable power requirements for the ground engaging wheels of a vehicle and one or more auxiliary powered earthmoving implements. The ground wheels of such a machine (not shown) are coupled to power output member 24 through transmission 14 which may be of conventional power shift construction allowing rapid changes of speed and direction of the vehicle. The earthmoving implements are coupled to power input member 20 and may comprise a plurality of implement motors 42 as shown by FIG. 1. In such an arrangement, power may be apportioned to the ground engaging wheels and the motors within variable limits as established by the machine operator according to the instant phase of operation. For example, when loading earth from a bank through manipulation of hydraulically-operated implements and an earthmoving bucket, it is frequently necessary to apply considerable drawbar push through the ground engaging wheels. The power requirements of both the implements and wheels are high under such conditions, and if the wheels are allowed to absorb full power the engine speed drops to the point of detrimentally affecting the speed of the auxiliary equipment, and hence less earth is loaded in a given period of time. Further, supplying too much power to the wheels under such conditions frequently causes excessive tire spinning and extremely costly tire wear. Therefore, for better loading capability it has been found that operators provided with the FIG. 2 drive train and control system of the present invention set the controls to minimize tire slip and to substantially favor power delivery to the auxiliary equipment.

Power delivery to the ground engaging wheels is reduced at the time of the severe loads by operator manipulation of lever 56, as shown in FIG. 1, to the point of avoiding wheel slip. This greatly increases the service life of the tires and provides proportionately more engine power to the auxiliary equipment to improve substantially the loading cycle time. As hereinbefore stated, lever 56 is adjustable to provide an intermediate pressure level to conduit 54 through the pressure-reducing action of regulating valve 50. This intermediate pressure level is reflected at passage 28 leading to clutch actuating piston 30 of FIG. 2 and is effective to provide a torque converter capacity of intermediate power delivery setting above 1750 rpm engine input speed, for example, as may be appreciated by reference to broken line 187 of the graph of FIG. 5. When the engine lugs down below this speed, speed sensing valve 34 causes the pressure to be metered from conduit 54 to passage 28 and actuating piston 30 along solid line 188 to the extent of decreasing engagement of the clutch until outer impeller member 184 is freewheeling with respect to inner impeller member 182. This action tends to maintain the engine at a higher and more responsive operating speed insofar as operation of the auxiliary equipment is concerned.

However, if the vehicle is operated in other than the above-noted operating cycle for a brief period, such as while transporting a loaded bucket up an incline, drawbar or power output requirements to the ground engaging wheels could be adversely affected. Under such conditions, the operator can quickly and conveniently override the above-noted setting of regulating valve 50 by depression of plunger 122 which causes rotation of spool 132 and subsequent opening of conduit 116 to drain 148, as may be noted with reference to FIG. 3 and FIG. 4. This causes leftward movement of spool 102 away from its metering function at 106 since balance pressure is relieved in passage 110. Conduit 54 is thus opened to the full pressure in passage 82 as controlled by priority and reducing valve 48 so that slippable clutch 186 of FIG. 2 is fully engaged. Maximum power is thus transmitted through torque converter 170 to power output member 24 and to the wheels to allow the vehicle to quickly climb the incline. Upon a return to the stockpile loading operation, the operator does not have to readjust the regulating valve as it is only necessary to depress the foot-operated plunger to return regulating valve 50 to its formerly adjusted metering function.

In the event a transmission gear shift selection is made, conduit 54 is opened to drain as mentioned above with respect to the FIG. 1 drive train. This momentarily disengages clutch 186 of the FIG. 2 drive train embodiment to decrease, but not entirely interrupt, transmission of power through torque converter 170. This decreases the energy absorption requirements on the engaging clutches of transmission 14.

Description of Second Embodiment of Override Valve

FIG. 6 is a second embodiment of foot-operated override valve 58. A valve housing 190 contains a plunger 192 which will also open conduit 116 to drain 148 at every other stroke of the plunger. Housing 190 contains an end plug 194 having an extended ledge 195 which supports an index cam 196 mounted on a pin 198. Plunger 192 includes a contoured end 200 with a lower face 202, and depending elements 204, 206 and 208 as shown more clearly in FIG. 8. An indexing pin 210 depends from plunger face 202 and is used to index the cam mechanism as will be described below.

Assuming that regulating valve 50 is metering an intermediate pressure level to conduit 54, as shown by FIG. 3, and that this pressure is also reflected in passage 110 internally of spool 102 and in conduit 116, it may be noted that in the position of plunger 192 shown in FIG. 6, conduit 116 is blocked. As foot pressure is applied, plunger 192 moves leftwardly, opening conduit 116 to drain 148 via an annulus 212 and housing chamber 214. Pin 210 strikes the face of index cam 196, causing it to turn clockwise as may be seen by comparing the first and second operating conditions of the mechanism as shown by FIG. 8 and FIG. 9, respectively. As foot pressure is released, plunger 192 moves rightwardly due to the return force of a biasing spring 216. Depending element 204 then contacts index cam 196 and rotates it further clockwise to the locked position shown by the third operating condition of FIG. 10. In this condition, the operator has removed his foot from the plunger and conduit 116 is still opened to drain. This position corresponds to maximum potential power delivery to power output member 24 since maximum pressure is available in conduit 54 leading to the slippable clutch.

The lock may be released by further depression of plunger 192 to move depending pin 210 against index cam 196 at the same time that depending element 204 has been cleared, as represented by the fourth condition shown by FIG. 11. Further plunger travel to the left causes further clockwise rotation of the index cam to the fifth condition of FIG. 12 and represents a condition that can be maintained by operator force only. As foot pressure is released, depending element 204 will strike index cam 196 to rotate it clockwise and return it to the starting position represented by FIG. 8.

The electric override valve position indicator switch 150 and light 152 mentioned above may be replaced by a suitable pointer (not shown) externally mounted on the floor board and which the operator may directly observe with respect to the plunger valve stroke.

In view of the foregoing, it is readily apparent that the structure of the present invention provides an improved override control system for a drive train having variable power transmission means, the control system is particularly adaptable for conveniently and instantaneously maximizing power delivery to an output member of the drive train from a normal condition where power delivery is favored to auxiliary powered work implements in order to optimize vehicle performance under each instant phase of operation. An operator may conveniently adjust the override system by foot, thus freeing the operator's hands for other duties and allowing quick changeover between two power-apportioning modes of operation of a slippable clutch drive train. Such an override system can also be associated with an indicator device of the type described above that will serve to advise the operator as to which of the two modes of operation prevail at any one instant.

While the invention has been described and shown with particular reference to two drive train embodiments and two override valve embodiments, it will be apparent that many variations are possible within the scope of the present invention, which is intended to be limited only by the following claims.

What is claimed is:

1. A control system for a drive train having an engine-driven power input member and auxiliary equipment coupled with the power input member for operation by the prime mover and having at least momentarily substantial power requirements relative to available power from the prime mover, a power output member and a hydraulically-operated slippable clutch operatively coupling the power input member and power output member in order to vary torque transmission therebetween, comprising a source of fluid under pressure, a control valve arranged in communication with said source and the hydraulically-operated clutch, said control valve including a spool means for alternately providing a fixed flow condition of fluid at a predetermined maximum pressure for fully engaging the clutch and a variable flow condition of fluid at an adjusted pressure lower than the predetermined maximum pressure for variably engaging the clutch, manually operable override means operatively coupled with said spool means in said control valve, said spool means in said control valve means including means responsive to operation of said override means for operating said spool means to alternately communicate to the clutch the predetermined maximum pressure in the fixed flow condition and the adjusted pressure in the variable flow condition, and adjustment means operatively coupled with said spool means in said control valve means for selectively establishing the adjusted pressure independent from response of said spool means to said override means, said adjustment means comprising a load piston means resiliently coupled with said spool means and a manual control element coupled with said load piston means to vary resilient force applied upon said spool means by said load piston means.

2. The control system of claim 1 wherein said override means comprises a reciprocable foot-operated plunger operatively coupled with said spool means in said control valve.

3. The control system of claim 1 further comprising indicator means responsive to said override means to indicate the flow condition of said spool means in said control valve.

* * * * *

UNITED STATES PATENT AND TRADEMARK OFFICE
CERTIFICATE OF CORRECTION

PATENT NO. : 3,951,009
DATED : April 20, 1976
INVENTOR(S) : SIDNEY J. AUDIFFRED, JR.
JAMES L. SCHMITT It is certified that error appears in the above-identified patent and that said Letters Patent are hereby corrected as shown below:

Title Page at "[75] Inventors:"

The inventor's name is misspelled "SIDNEY J. AUDIFFERD," and should be --SIDNEY J. AUDIFFRED--.

Signed and Sealed this

Nineteenth Day of October 1976

[SEAL]

Attest:

RUTH C. MASON
*Attesting Officer*

C. MARSHALL DANN
*Commissioner of Patents and Trademarks*